United States Patent [19]

Staeger

[11] Patent Number: 4,583,359
[45] Date of Patent: Apr. 22, 1986

[54] PROFILE TUBES FOR THE PRODUCTION OF READILY ASSEMBLED AND DISMANTLED STRUCTURES

[75] Inventor: Hans Staeger, Schönbuch, Fed. Rep. of Germany

[73] Assignee: Octanorm-Vertriebs-Gesellschaft mit beschrankter Haftung fur Bauelemente, Filderstadt, Fed. Rep. of Germany

[21] Appl. No.: 674,123

[22] Filed: Nov. 23, 1984

[30] Foreign Application Priority Data

Nov. 25, 1983 [DE] Fed. Rep. of Germany ....... 3342616

[51] Int. Cl.⁴ ................................................. E04C 3/30
[52] U.S. Cl. ........................................ 52/721; 52/738; 403/255
[58] Field of Search ............... 52/738, 721; 403/190, 403/255, 406, 407, 187

[56] References Cited

U.S. PATENT DOCUMENTS

| 3,574,367 | 4/1971 | Jankowski. |
| 3,945,742 | 3/1976 | Condevaux ........................ 403/255 |
| 4,017,199 | 4/1977 | Strassle ............................ 403/190 X |
| 4,142,343 | 3/1979 | Trafton ............................. 52/738 X |
| 4,455,103 | 6/1984 | Hackenberg. |
| 4,490,064 | 12/1984 | Ducharme ........................ 403/255 |

FOREIGN PATENT DOCUMENTS

| 514900 | 6/1979 | Australia. |
| 2616440 | 10/1977 | Fed. Rep. of Germany. |
| 2941008 | 11/1980 | Fed. Rep. of Germany. |
| 422870 | 1/1968 | Switzerland. |
| 582848 | 12/1976 | Switzerland. |

*Primary Examiner*—Carl D. Friedman
*Attorney, Agent, or Firm*—Burns, Doane, Swecker & Mathis

[57] ABSTRACT

A framework for use as a support at fairs and exhibitions comprises section tubes connected to other tubes by means of clamp elements. Each clamp element includes a mounting portion which is longitudinally received within a longitudinal inner space of a profile tube, and a clamping portion which is received within a longitudinal external groove of another tube. The inner space has recesses for receiving the mounting portion in different orientations. The recesses are arranged in sets whereby when the clamping element is in one set of recesses it is oriented in one manner, and when in another set of recesses it is oriented in a different manner.

1 Claim, 9 Drawing Figures

Fig. 1
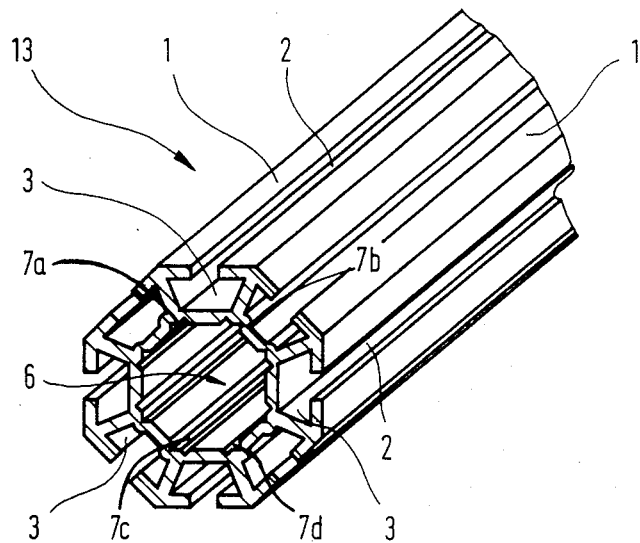
Fig. 2
Fig. 3
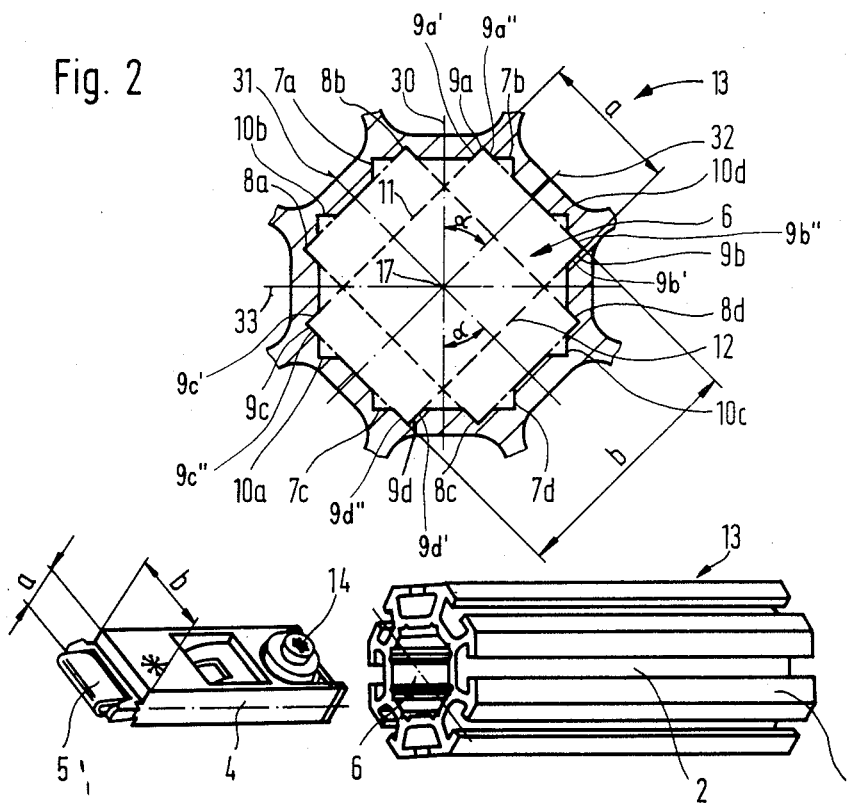

{ 4,583,359 }

PROFILE TUBES FOR THE PRODUCTION OF READILY ASSEMBLED AND DISMANTLED STRUCTURES

BACKGROUND AND OBJECTS OF THE INVENTION

The invention relates to a special section tube for the production of readily assembled and dismantled framework structures, in particular for use at fairs and exhibitions, with a plurality of undercut longitudinal grooves on the outside, which are engaged by the joining parts of clamping elements with a rectangular outer cross-section to connection with further sectional parts.

Special section tubes of this type are known for example in German DE-AS No. 29 41 008. The tubes generally are hollow, defining a cylindrical, longitudinally centrally arranged cavity that is relatively small compared with the external dimensions of the tube. A plurality of longitudinal chambers are arranged in a circumferentially spaced manner around the tube circumference. The chambers are open to the outside by means of longitudinal grooves and are adapted to receive so-called tie bars which clamp into the grooves. Such clamping elements have an approximately square block-shaped external configuration and may be installed into section supports also having a rectangular cross-section. The clamping elements are held in position within the section supports by means of bolt heads protruding outwardly through bore holes in the supports and actuable from the outside, in order to pressure the tie bars outwardly and to pull them to the rear. It is a disadvantage of these known configurations that in this manner only rectangularly-shaped section supports may be connected with the special section tubes, and that such tubes may not be assembled to each other by means of the clamping elements, or at least not in a simple fashion.

It is also known, for example in U.S. Pat. No. 3,574,367, to use square section tubes similar to the afore-mentioned type exclusively as parts for the assembly of a frame, which also may be assembled with each other by means of clamping elements equipped with spreading parts. However, the variational possibilities and also the esthetic appearance of the afore-mentioned special section tubes with eight, but at least six edges, cannot be attained by these configurations.

It is an object of the present invention to provide special section tubes of the above-mentioned type so that the mutual joining of several section tubes may be effected by means of the clamping elements with the option of numerous variations, but that in spite of this, the connection of other sectional supports, as in the state of the art, is not excluded.

SUMMARY OF PREFERRED EMBODIMENTS OF THE INVENTION

The invention involves a special section tube of the afore-mentioned type in that the hollow internal space is provided with groove-like recesses longitudinally parallel to each other and located diametrically opposed in pairs, with their width and mutual distance being adapted to the dimensions of the external cross-section of the clamping elements. This configuration yields the advantages that the clamping elements used for the construction of the frame may now be inserted longitudinally into the section tubes heretofore used only as supports or connecting elements for rectangular, bent or straight girders, so that two or more octagonal, hexagonal or polygonal tubes may be joined together. Appropriately, the recesses are arranged symmetrically to a center plane extending through the axis of the special section tube. If the center planes are arranged at equal angles with respect to each other, the even-numbered multiple whereof is 360 degrees, a multitude of structural and configurational possibilities are obtained whereby one or more special section tubes can be attached directly to, and at right angles to, another special section tube and at a selected number of different angles.

It has been discovered that four pairs of recesses, with their center planes extending at an angle of 45 degrees with respect to each other, are sufficient in the case of an octagonal section to make possible a largely arbitrary arrangement of a pleasing appearance, of further section tubes. In the section tubes, which now serve as the support for the clamping elements, depending on the position of the clamping elements, lateral bore holes must be provided for access to the actuating parts, if clamping elements of the afore-mentioned type with laterally actuable expanding parts are used. In the case of octagonal section tubes it is further convenient for optical reasons to provide adaptor pieces at the joint between two section tubes to equalize the distance that normally exists between the straight frontal side of a section tube set perpendicularly against another section tube. However, by means of the configuration according to the present invention, the potential applications of the known section tube constructions for fair and exhibition structures, or the like, are considerably extended.

THE DRAWING

The objects and advantages of the invention will become apparent from the following detailed description of preferred embodiments thereof, in connection with the accompanying drawings in which like numerals designate like elements, and in which:

FIG. 1 is a partial perspective view of a section tube profile according to the invention with an octagonal external cross-section;

FIG. 2 is a schematic cross-sectional view of a section tube depicting the configuration of the internal chamber;

FIG. 3 is an exploded view of a section tube according to FIG. 1 along with a clamping element that may be inserted longitudinally into the front of the section tube;

DETAILED DESCRIPTION OF PREFERRED EMBODIMENTS OF THE INVENTION

Figure 4:
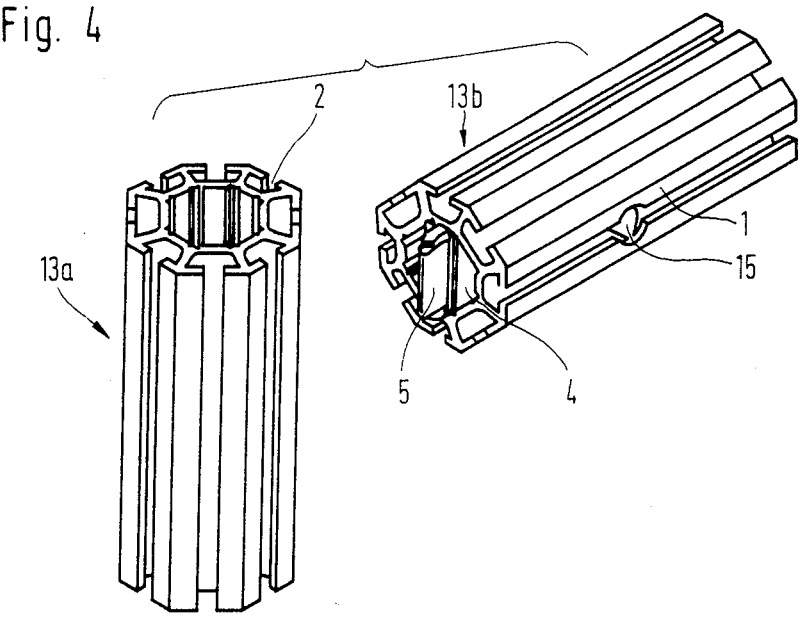
FIG. 4 depicts, in perspective, a pair of identical section tubes about to be joined by a clamping element inserted into one of the section tubes.

FIG. 1 shows an embodiment of the present invention wherein a section tube has eight corners, the eight longitudinal sides 1 of which being provided with longitudinal grooves 2. The grooves are undercut in that they open into wider chambers 3, which are also parallel to the axis of the section tube. In a manner known and further explained with respect to FIG. 4, a clamping end of the clamping element 4 includes a tie bar clamp 5 which may be inserted in the longitudinal grooves 2. The clamp 5 may be secured within a longitudinal groove 2 by being spread outward following its insertion within the chamber 3 and being drawn back in the direction of the clamping element 4. That action is effected by means of externally actuated screw elements 14 with the aid of eccentrics (not shown), the screw being situated in a mounting end of the clamping element, i.e., an end thereof which is releasably mounted in an internal longitudinal space of a profile tube. Such a clamp 5 is disclosed in more detail in U.S. Pat. No. 4,455,103 issued June 19, 1984, the disclosure of which is incorporated herein by reference.

The profile tube is hollow whereby inner surfaces define a hollow internal space 6 which in FIG. 2 is of octagonal section. Those surfaces, as shown in more detail in FIG. 2, are provided with a plurality of groove-like recesses 7a, 7b, 7c, 7d; 8a, 8b, 8c, 8d and 9a to 9d and 10a to 10d, arranged in each case parallel and diametrically opposed to each other. All of the recesses 7a, 7b, 7c, 7d (together with the other recesses) are parallel to each other. Each of the recesses includes a pair of mutually angled sides (for example, recess 9a has a pair of sides 9a' and 9a"). Each side is aligned with a side of another recess to form the corners of an imaginary rectangle. For example, side 9a' is aligned with side 9c'; side 9c" is aligned with side 9d"; side 9d' is aligned with side 9b'; side 9b" is aligned with side 9a", whereby the recesses 9a, 9c, 9c and 9b define the corners of an imaginary rectangle depicted by broken lines 11, 12 in FIG. 2. Two of the recesses, 9a and 9b are spaced apart by a distance a, and are spaced from respective diametrically opposed recesses 9c, 9d by a distance b. The remaining pairs of recesses are spaced by corresponding distances, e.g., recess 7a and 7b are spaced from each other by distance a and from diametrically opposed recesses 7c and 7d by distance b. Thus, a plurality of equally sized imaginary rectangles are defined within the hollow space 6 which are each adapted to receive a clamping element 4.

Thus, the recesses define a plurality of sets of recesses, the sets being oriented differently relative to one another. The mounting end of the clamping element is adapted to be longitudinally received selectively in any one of said sets in order to vary the orientation of the clamping element relative to the profile tube. When positioned in any of the sets of recesses, the clamping element is constrained against rotation.

Preferably, each set of recesses comprises a first pair of recesses (e.g., 9a and 9b) and a second pair of recesses (e.g., 9c and 9d) which are diametriclaly opposed to the first pair. The clamping element 4 may be inserted from the front end of the section tube 13. The cross-sections of the imaginary rectangles correspond to the cross-section of the clamping element 4, as may be seen in FIG. 3. This configuration makes it possible to insert the clamping element 4 with its rectangular dimensions in four different angular positions into the section tube 13 from the frontal side, if the screw element 14 (necessary for the actuation of the tie bar clamp 5, which may be connected with an eccentric) is previously removed.

FIG. 4 shows the clamping element 4 with the tie bar clamps 5 inserted from the frontal side of a tube 13b, with the tie bar clamps thereof being compressed in the position shown so that they may be introduced through the longitudinal grooves 2 of another tube 13a. The screw element 14 may then be inserted and actuated through a lateral orifice 15. The eccentric acts between the tie bar clamps 5, pressuring them laterally apart and drawing them in the direction of the clamping element 4, so that the section tube 13a may be joined to the section tube 13b perpendicularly.

Figure 5:
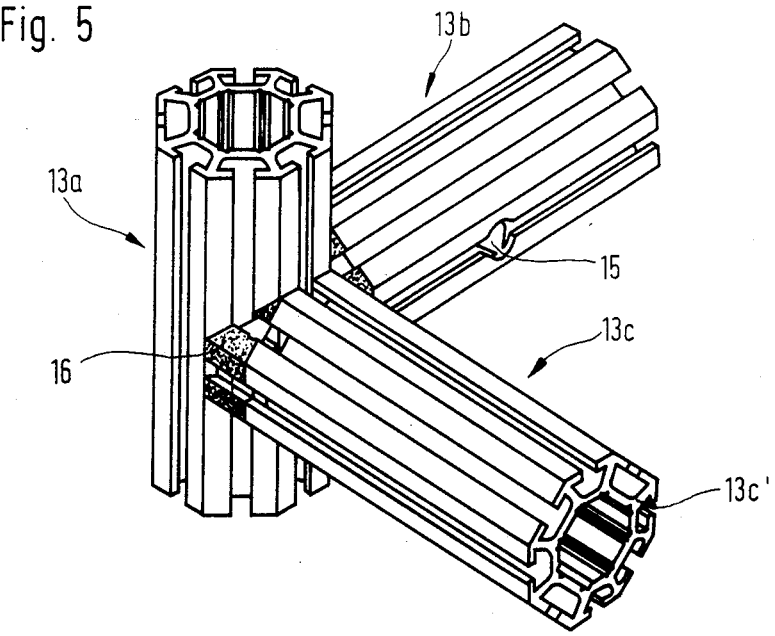
FIG. 5 depicts, in perspective, three section tubes assembled according to the invention, along with adaptor pieces attached for aesthetic reasons.

FIG. 5 shows three interconnected section tubes 13a, 13b and 13c, which are held together perpendicularly by means of the clamping elements 4 (not shown in FIG. 5) inserted from the frontal side. For aesthetic reasons, but also to prevent unnecessary soiling or the unintentional clamping of parts introduced from the outside, adaptor pieces 16 are provided on the frontal side of the two section tubes to bridge the distance necessarily created in the case of octagonal profiles that are frontally joined.

Figure 6:
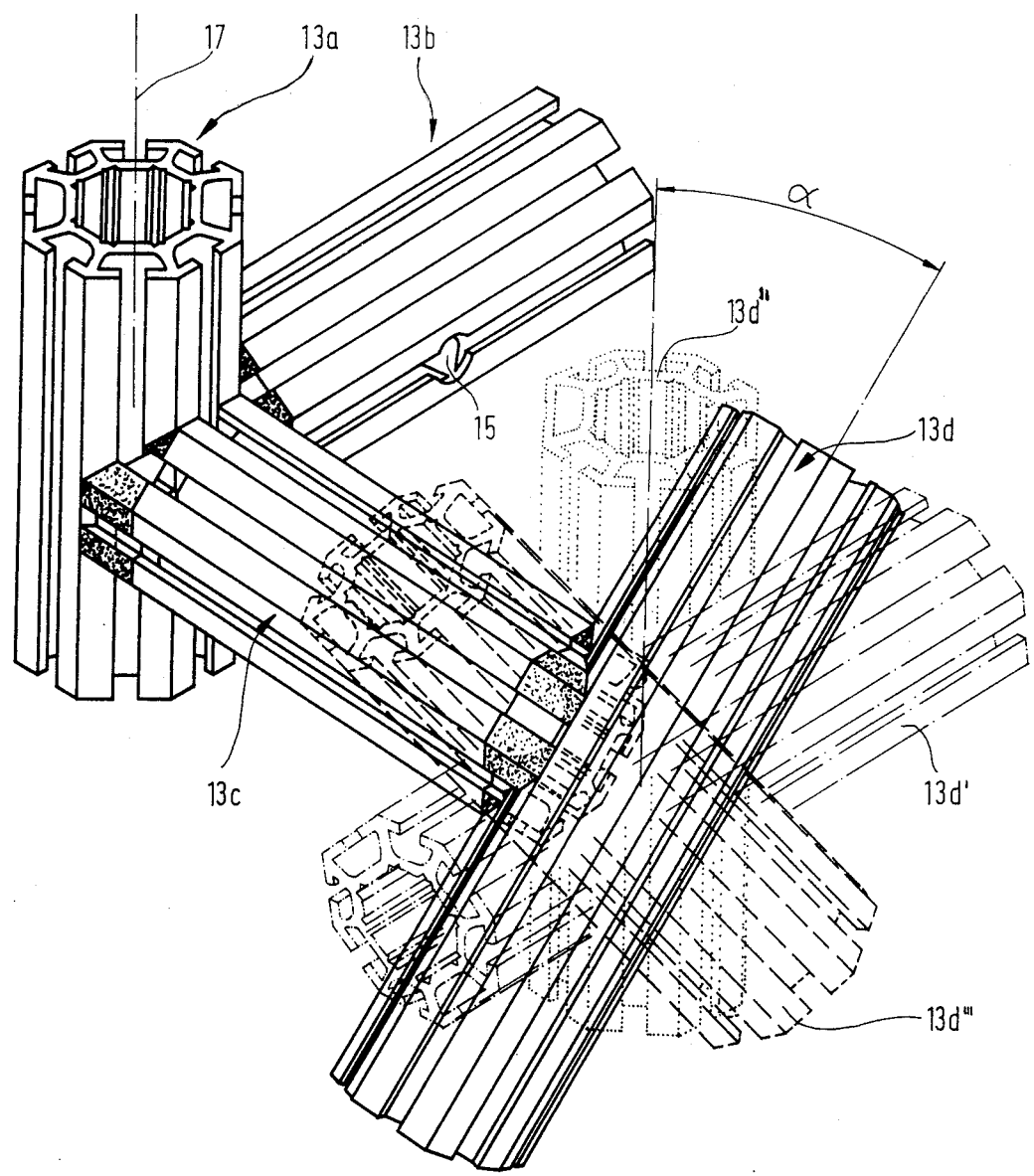
FIG. 6 depicts, in perspective, four assembled section tubes with a number of optional arrangements of the fourth section tube indicated in broken lines.

FIG. 6 shows that by the insertion of a further clamping element on the frontal side 13c' of the section tube 13c of FIG. 5, another section tube 13d may be connected with the section tube 13c, specifically in the present example of embodiment at an angle of 45 degrees to the axis 17 of the vertical section tube 13a. As indicated by dash-and-dot, broken and dotted lines, the positions 13d', 13d", and 13d''' may further be obtained by an appropriate reorientation of the clamping element in the section tube 13c. The position 13d' is parallel to the section tube 13b; the position 13d" is parallel to the section tube 13a' and the position 13d''' is offset by 90 degrees with respect to the extended position of the section tube 13d. FIG. 6 thus illustrates the multitude of possible variations of the assembly of the section tubes 13a to 13d. It is obviously also possible, as in the state of the art, to connect other sections, for example, bent or straight rectangular support sections, with or without longitudinal grooves in the section tubes 13a to 13d by means of clamping elements 4, as is already known in the prior art. But the angular variation of the section tubes 13a to 14d improves the structural possibilities of frames according to the state of the art.

Figure 7:
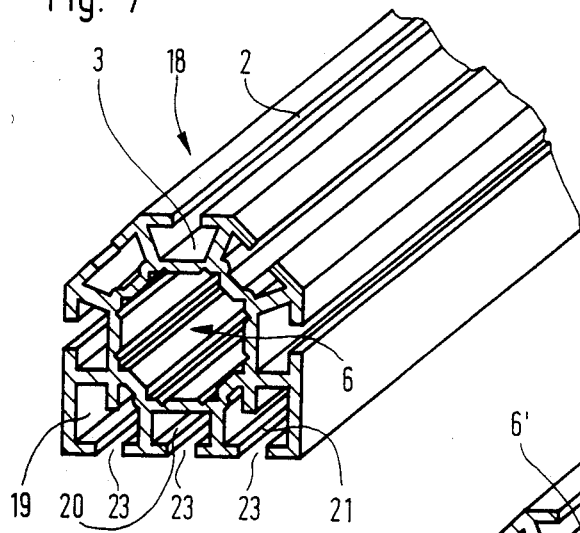
FIG. 7 depicts, in perspective, a further preferred embodiment of a section tube according to the invention.
Figure 8:
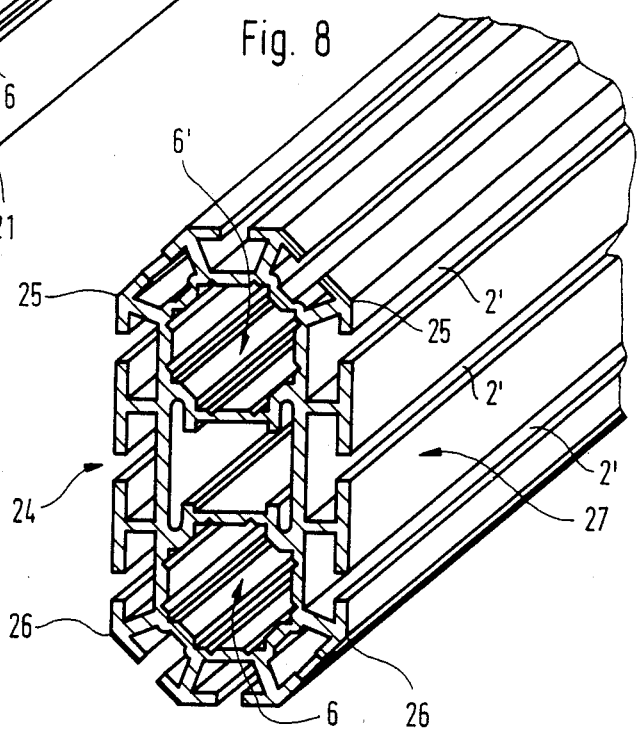
FIG. 8 depicts, in perspective, yet another variation of the section tube.
Figure 9:
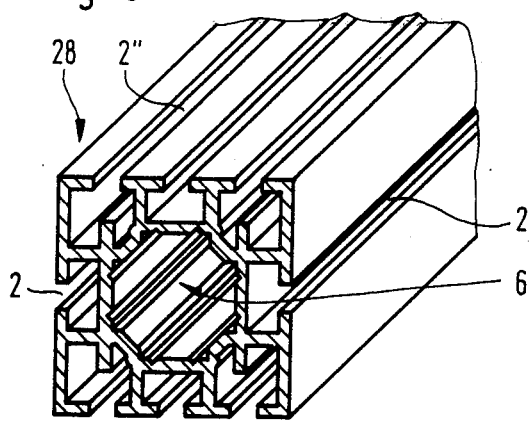
FIG. 9 depicts, in perspective, a further embodiment comprising a square section tube shape with several longitudinal grooves for the insertion of tie bar clamps and the possibility of arranging a clamping element in the cavity of the section.

FIGS. 7 to 9 show further sections in accordance with the teachings of the invention. FIG. 7 shows a rectangular section 18 equipped only to approximately one-half with longitudinal chambers and longitudinal grooves 2, arranged at an angle of 45 degrees with respect to each other. On its other half, the section 18 has three chambers 19, 20 and 21 parallel to each other, the longitudinal grooves 23 whereof are always in one plane, but the configuration of the hollow internal space 6 corresponds to the section tube 13 of FIG. 1.

FIG. 8 shows a double profile 24 with eight external edges, the external edges 25 and 26 whereof are at a larger distance from each other than attained by a straight intermediate piece 27 having three of the longitudinal grooves 2. This section 24 comprises two hollow internal spaces 6' having the same configuration than the cavity 6 of the section 13 in FIG. 1. Numerous types of joints are possible with this profile.

FIG. 9 finally exhibits a section 28 provided with square outer dimensions, while the internal space 6 is again similar in configuration to that of the section 13 in FIG. 1. The section 28 has only one longitudinal groove 2 on two opposing sides, and three longitudinal grooves 2" on the other two opposing sides.

It would obviously be possible to design other types of sections in the manner of the invention. The essential feature involves the configuration of the internal space that makes it possible to insert, secure and connect with other, similar section tubes, a plurality of clamping elements with rectangular outer dimensions, at different angles, from the frontal side.

Although the present invention has been described in connection with preferred embodiments thereof, it will be appreciated by those skilled in the art that additions, modifications, substitutions, and deletions not specifically described, may be made without departing from the spirit and scope of the invention as defined in the appended claims.

What is claimed is:

1. In a framework comprising at least first and second octagonal profile tubes, and a clamping element interconnecting said first and second profile tubes, said clamping element including a clamping end and a mounting end of non-square rectangular cross-section, said profile tubes each being hollow and including internal surface means defining a longitudinal internal space, eight longitudinal grooves spaced around the outer circumference of each profile tube, said grooves including undercut portions which receive said clamping end of the clamping element, the internal space of said profile tube longitudinally receiving said mounting end of said clamping element, said mounting end including a hole for receiving a pin projecting through a recess in an associated one of said grooves, said surface means including longitudinally extending, parallel recesses spaced circumferentially apart, there being four sets of said recesses arranged symmetrically relative to a longitudinal center plane of said inner space, each set of recesses comprising a first pair of recesses and a second pair of corresponding recesses disposed generally diametrically opposite said first pair of recesses, said first and second pairs of recesses being arranged to form a non-square rectangular opening corresponding to said cross-section of said mounting end for longitudinally receiving said mounting end of the clamping element and preventing rotation of the clamping element within said profile bar, said sets of recesses being spaced apart by 45 degrees to receive the clamping element in four different orientations, with said hole facing a respective one of said grooves in each of said four orientations.

* * * * *